US011128557B2

(12) United States Patent
Dubey et al.

(10) Patent No.: US 11,128,557 B2
(45) Date of Patent: Sep. 21, 2021

(54) TUNNEL-BASED ROUTING CALCULATION IN SOFTWARE- DEFINED NETWORKING (SDN) ENVIRONMENTS

(71) Applicant: VMWARE, INC., Palo Alto, CA (US)

(72) Inventors: Ankur Dubey, Pala Alto, CA (US); Sami Boutros, Palo Alto, CA (US); Abhishek Goliya, Pune (IN)

(73) Assignee: VMWARE, INC., Palo Alto, CA (US)

( * ) Notice: Subject to any disclaimer, the term of this patent is extended or adjusted under 35 U.S.C. 154(b) by 26 days.

(21) Appl. No.: 16/727,954

(22) Filed: Dec. 27, 2019

(65) Prior Publication Data
US 2021/0144084 A1 May 13, 2021

(30) Foreign Application Priority Data
Nov. 13, 2019 (IN) .............................. 201941046096

(51) Int. Cl.
| | |
|---|---|
| *H04L 12/28* | (2006.01) |
| *H04L 12/755* | (2013.01) |
| *H04L 12/733* | (2013.01) |
| *H04L 12/46* | (2006.01) |
| *H04L 12/741* | (2013.01) |
| *H04L 12/721* | (2013.01) |

(52) U.S. Cl.
CPC ........ *H04L 45/021* (2013.01); *H04L 12/4633* (2013.01); *H04L 45/20* (2013.01); *H04L 45/54* (2013.01); *H04L 45/566* (2013.01)

(58) Field of Classification Search
CPC .... H04L 45/021; H04L 12/4633; H04L 45/20
See application file for complete search history.

(56) References Cited

U.S. PATENT DOCUMENTS

| | | | |
|---|---|---|---|
| 9,699,030 B1 * | 7/2017 | Kumar ................. | H04W 84/18 |
| 2016/0226753 A1 * | 8/2016 | Young ................... | H04L 45/64 |
| 2017/0054758 A1 * | 2/2017 | Maino ................. | H04L 41/5025 |
| 2018/0159957 A1 * | 6/2018 | Hooda ................... | H04L 45/64 |
| 2018/0248713 A1 * | 8/2018 | Zanier ................ | H04L 12/4633 |
| 2018/0302321 A1 * | 10/2018 | Manthiramoorthy ....................... H04L 49/1569 |
| 2021/0029024 A1 * | 1/2021 | Lopez ................ | H04L 12/4633 |

\* cited by examiner

*Primary Examiner* — Elisabeth Benoit Magloire
(74) *Attorney, Agent, or Firm* — Su IP Consulting

(57) ABSTRACT

Example methods and network devices for tunnel-based routing calculation. One example method may comprise establishing a tunnel between a first tunnel interface and a second tunnel interface; establishing a first session for routing information exchange between a first tunnel endpoint and an underlay network device; establishing a second session for routing information exchange between the first tunnel interface and the second tunnel interface over the tunnel. In response to receiving first routing information over the first session, the underlay network device may be configured to be a next hop to reach the second tunnel endpoint by updating a routing table to include a first entry. Further, the underlay network device may be retained as the next hop by updating the routing table to include a second entry to override second routing information that advertises, over the second session, the second tunnel interface as the next hop.

21 Claims, 8 Drawing Sheets

TUNNEL-BASED ROUTING CALCULATION IN SOFTWARE- DEFINED NETWORKING (SDN) ENVIRONMENTS

RELATED APPLICATIONS

Benefit is claimed under 35 U.S.C. 119(a)-(d) to Foreign Application Serial No. 201941046096 filed in India entitled "TUNNEL-BASED ROUTING CALCULATION IN SOFTWARE-DEFINED NETWORKING (SDN) ENVIRONMENTS", on Nov. 13, 2019, by VMWARE, Inc., which is herein incorporated in its entirety by reference for all purposes.

CROSS-REFERENCE TO RELATED APPLICATION

The present application is related in subject matter to U.S. patent application Ser. No. 16/727,968, which is incorporated herein by reference.

BACKGROUND

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. Depending on the desired implementation, VMs deployed at different geographical sites may communicate via a tunnel established between the sites. In practice, any issues affecting the tunnel will also affect cross-site connectivity and network performance.

DETAILED DESCRIPTION

Figure 1:
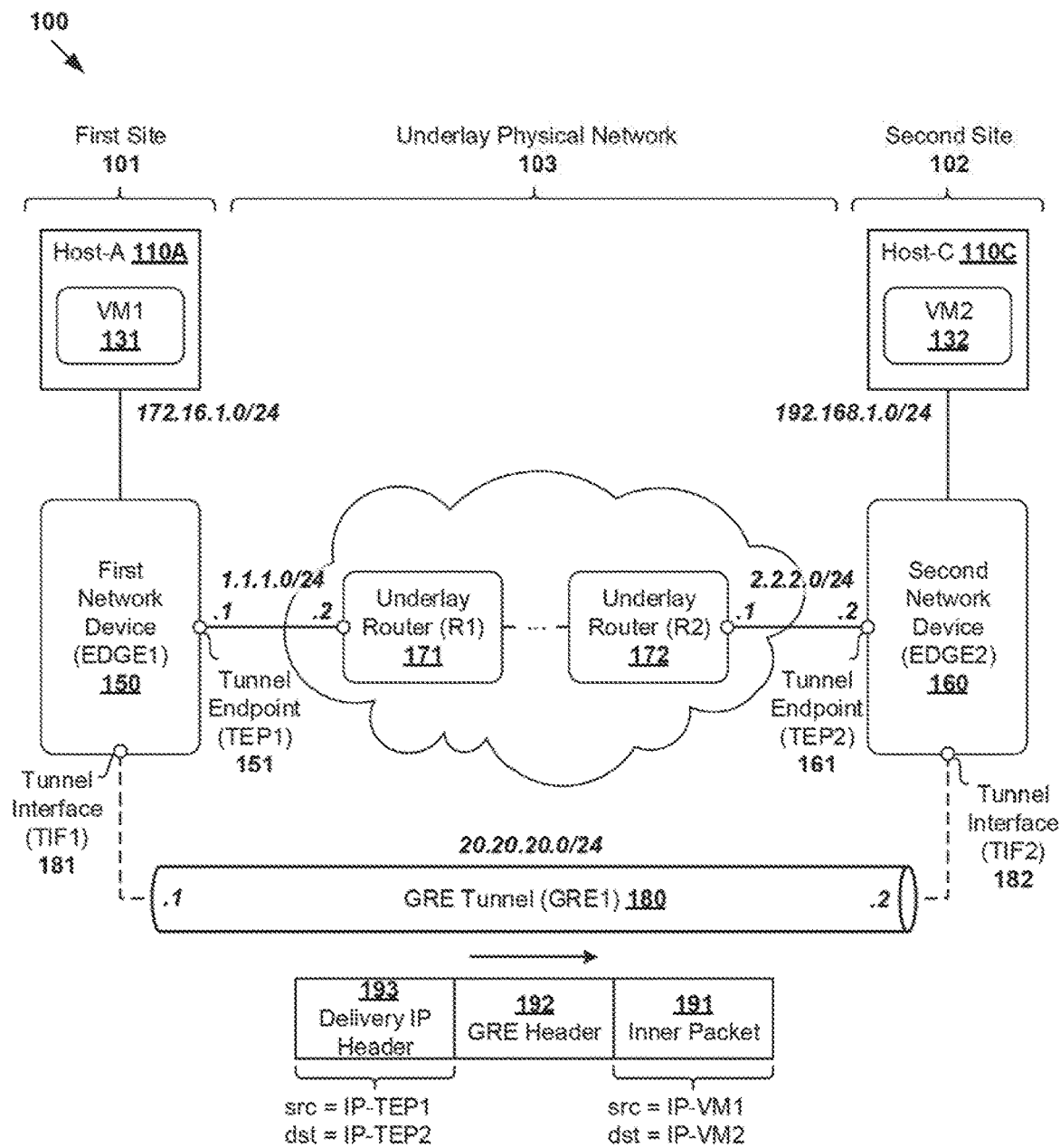
FIG. 1 is a schematic diagram illustrating an example software-defined networking (SDN) environment in which tunnel-based routing calculation may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
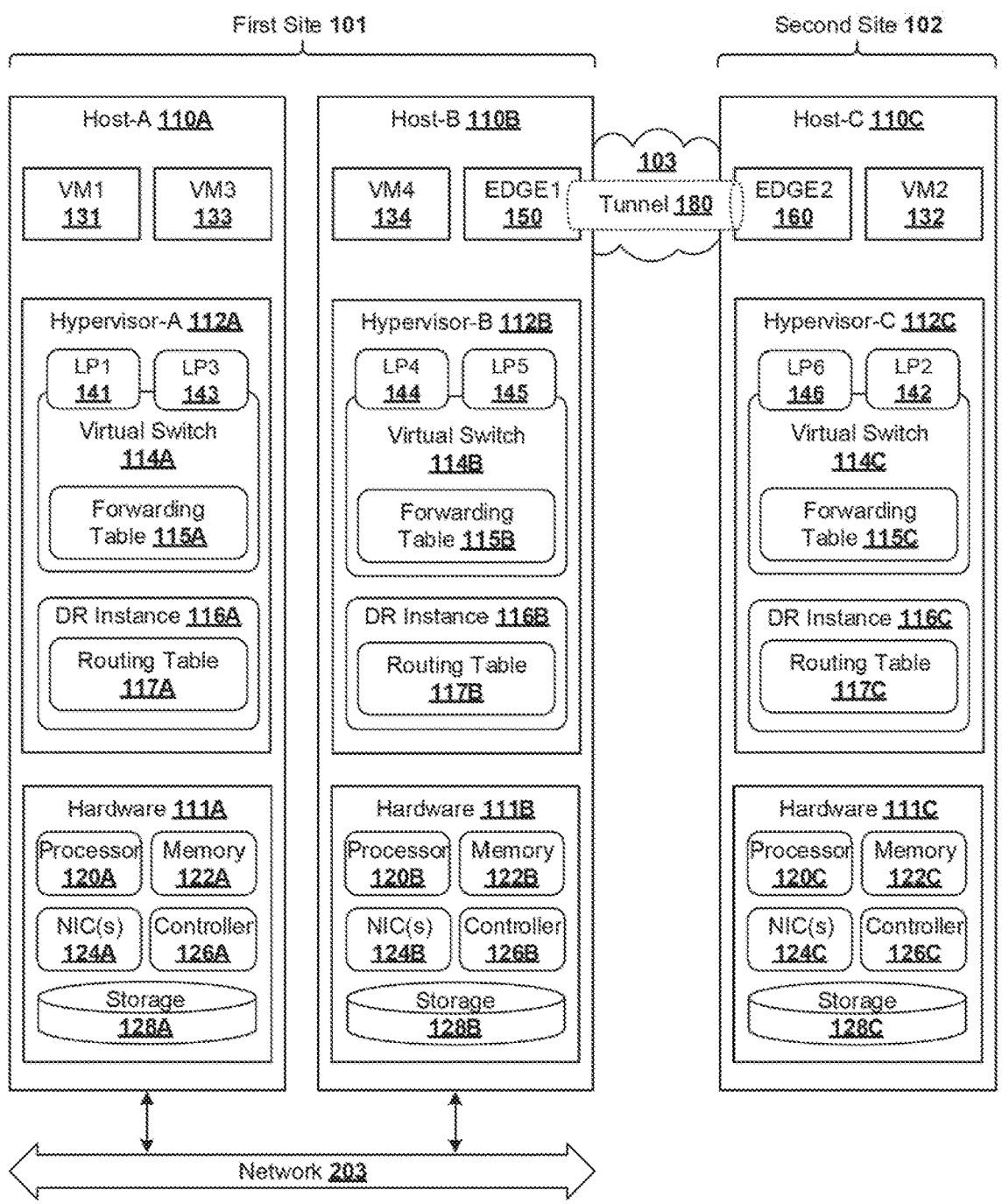
FIG. 2 is a schematic diagram illustrating an example physical view of the SDN environment in FIG. 1.

FIG. 1 is a schematic diagram illustrating example software-defined networking (SDN) environment 100 in which tunnel-based routing calculation may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

In the example in FIG. 1, SDN environment 100 may include multiple hosts, such as host-A 110A, host-B 110B (shown in FIG. 2) and host-C 110C. In practice, hosts 110A-C may be located at geographically dispersed sites, such hosts 110A-B at a first site (see 101) and host-C 110C at a second site (see 102). To facilitate communication among hosts 110A-C over physical network 103, first network device 150 (labelled "EDGE1") may be deployed at the edge of the first site, and second network device 160 (labelled "EDGE2") at the edge of the second site.

As used herein, the term "network device" (e.g., edge 150/160) may refer generally to an entity that is capable of performing functionalities of a switch, router, bridge, gateway, edge, or any combination thereof, etc. In practice, network device 150/160 may represent a routing component for providing centralized stateful services such as firewall, load balancing, network address translation (NAT), intrusion detection, deep packet inspection, traffic shaping, traffic optimization, packet header enrichment or modification, packet tagging, or any combination thereof, etc. Network device 150/160 implemented using one or more virtual machines (VMs) and/or physical machines (also known as "bare metal machines"). Any suitable data-plane packet processing engine(s) may be implemented at network device 150/160. One example is the Data Plane Development Kit (DPDK), which is an open-source Linux Foundation project that provides a set of data plane libraries and (physical or virtual) NIC drivers to accelerate fast packet processing at network device 150/160.

Referring also to FIG. 2, EDGE1 150 and EDGE2 160 may be VMs supported by respective host-B 110B and host-C 110C. Hosts 110A-C may each include suitable hardware and virtualization software (e.g., hypervisors 112A-C) to support various VMs. For example, at first site 101, host-A 110A supports VM1 131 and VM3 133, and host-B 110B supports first edge 150 and VM4 134. At second site 102, host-C 110C supports EDGE2 160 and VM2 132. In alternative implementation(s), it should be understood that EDGE1 150 and/or EDGE2 160 may each be supported by a different host with respect to respective VM4 134 and VM2 132. Host-A 110A and host-B 110B may be connected via any suitable physical network 203.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

Through network virtualization, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

The VMs (e.g., VMs 131-134, 150 and 160) may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Tunnel-Based Connectivity

To facilitate traffic forwarding between first site 101 and second site 102, tunnel 180 may be established between EDGE1 150 and EDGE2 160 over underlay physical network 103. As used herein, the term "tunnel" may refer generally to a virtual point-to-point link between a pair of (non-directly connected) network nodes or entities across an underlay physical network. Any suitable tunneling protocol(s) may be used to establish tunnel 180, such as Generic Routing Encapsulation (GRE), Virtual Private Network (VPN), Internet Protocol Security (IPSec), Virtual eXtensible Local Area Network (VXLAN), Stateless Transport Tunneling (STT), Generic Network Virtualization Encapsulation (GENEVE), Network Virtualization using GRE (NVGRE), Layer 2 Tunneling Protocol (L2TP), any combination thereof, etc.

Using tunnel 180, source=VM1 131 on host-A 110A at first site 101 may communicate with destination=VM2 132 on host-C 110C at second site 102 via EDGE1 150 and EDGE2 160, and vice versa. From an overlay network perspective, tunnel 180 (e.g., GRE tunnel in FIG. 1) may be established between a first tunnel interface (see "TIF1" 181) configured on EDGE1 150 and a second tunnel interface (see "TIF2" 182) on EDGE2 160. In the example in FIG. 1, tunnel interfaces 181-182 represent virtual interfaces with IP addresses in the same subnet=20.20.20.0/24, such as IP-TIF1=20.20.20.1 and IP-TIF2=20.20.20.2. At EDGE1 150, TIF1 181 is known a local tunnel interface, and TIF2 182 a remote tunnel interface. At EDGE2 160, TIF1 181 and TIF2 182 are remote and local tunnel interfaces, respectively.

From an underlay network perspective, tunnel 180 may be established between a first tunnel endpoint (see "TEP1" 151) of EDGE1 150 and a second tunnel endpoint (see "TEP2" 161) of EDGE2 160. Here, the term "tunnel endpoint" may refer generally to any suitable point (e.g., physical interface) that originates or terminates a tunnel. EDGE1 150 and EDGE2 160 may be directly connected via underlay network device(s) in physical network 103, such as underlay routers labelled "R1" 171 and "R2" 172. At EDGE1 150, TEP1 151 is known as a "local endpoint" or "tunnel source," and TEP2 161 as a "remote endpoint" or "tunnel destination." At EDGE2 160, TEP2 161 may be referred to as a "local endpoint" or "tunnel source," while TEP1 151 as a "remote endpoint" or "tunnel destination."

In practice, a tunnel interface's IP address is distinct from the associated tunnel endpoint's IP address. For example, at EDGE1 150, TEP1 151 (e.g., loopback interface) is assigned with IP address IP-TEP1=1.1.1.1/32, which is in the same subnet=1.1.1.0/24 of directly-connected router R1 171 with IP-R1=1.1.1.2. Note that IP-TEP1=1.1.1.1/32 is different from IP-TIF1=20.20.20.1 of TIF1 181. Similarly, at EDGE2 160, TEP2 161 (e.g., loopback interface) is assigned with IP-TEP2=2.2.2.2/32, which is in the same subnet=2.2.2.0/24 of underlay router R2 172 with IP-R2=2.2.2.1. Note that IP-TEP2=2.2.2.2/32 is different from IP-TIF2=20.20.20.2 of TIF2 182.

The tunnel endpoint addresses are generally public addresses that are routable by, and therefore reachable via, underlay routers 171-172. When a packet (see 191) is transported via tunnel 180, the packet may be encapsulated with a tunnel header (e.g., GRE header; see 192) and an outer header called a delivery IP header (see 193). In the example in FIG. 1, inner packet 191 is addressed from source=IP-VM1 of VM1 131 to destination=IP-VM2 of VM2 132. The tunnel endpoint addresses are used in delivery header 193, such as from source IP-TEP1=1.1.1.1/32 associated with EDGE1 150 to destination IP-TEP2=2.2.2.2/32 associated with EDGE2 160.

In practice, the reachability between tunnel interfaces 181-182 over tunnel 180 may be learned using a dynamic routing protocol, such as border gateway protocol (BGP), Intermediate System to Intermediate System (IS-IS), OSPF (Open Shortest Path First), etc. In general, dynamic routing protocols enable routers to exchange routing information to learn about remote destinations dynamically. Routing information may be stored in a routing table or forwarding information base (FIB) as a basis for forwarding packets. In some cases, however, route advertisements received during multiple BGP sessions running on EDGE 150/160 may affect the connectivity over tunnel 180. This may in turn affect the connectivity between sites 101-102, thereby increasing system downtime and affecting network performance.

Tunnel-Based Routing Calculation

According to examples of the present disclosure, tunnel-based routing calculation may be performed in an improved manner to safeguard tunnel 180 and reduce the likelihood of tunnel flapping. Here, tunnel flapping may refer generally to a situation in which tunnel 180 becomes available (UP) and not available (DOWN) repeatedly over a period of time. For example in FIG. 1, through a first session for routing information exchange with R1 171, EDGE1 150 may learn a first route to reach second tunnel endpoint=TEP2 161 via underlay R1 171 in physical network 103. However, through a second session between TIF1 181 and TIF2 182, EDGE1 150 may learn a second route to reach TEP2 161 via TIF2 182. This may result in the flapping of tunnel 180 because the second route may be preferred over the first route via underlay R1 171. To reduce the likelihood of tunnel flapping and improve cross-site connectivity, the first route via underlay R1 171 may be retained according to examples of the present disclosure. The term "next hop" may refer generally to an entity (e.g., closest gateway or router, etc.) to which packets should be forwarded in order to reach a remote destination or network.

Figure 3:
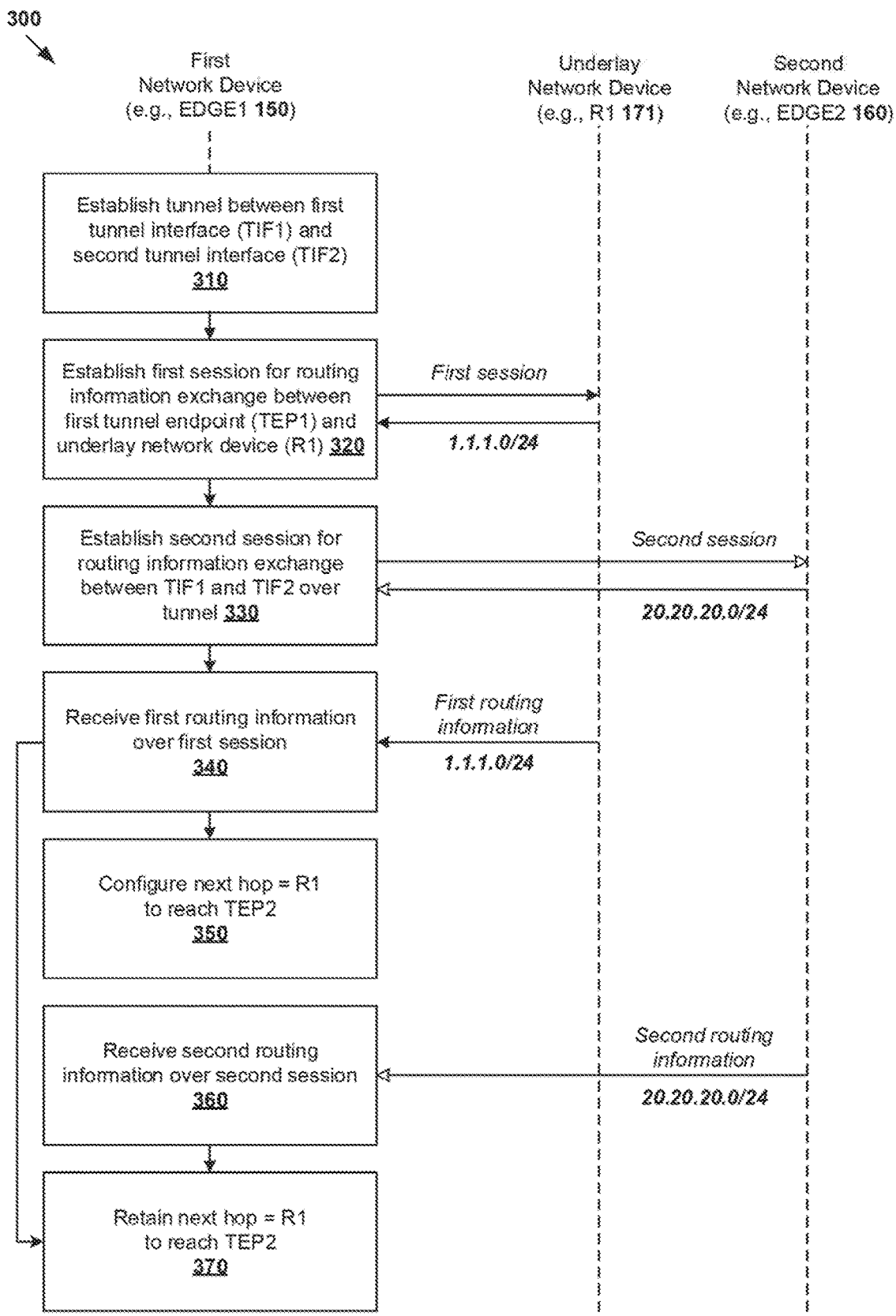
FIG. 3 is a flowchart of an example process for a network device to perform tunnel-based routing calculation in an SDN environment.

In more detail, FIG. 3 is a flowchart of example process 300 for a network device to perform tunnel-based routing calculation in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Throughout the present disclosure, various examples will be explained using EDGE1 150 as an example "first network device" or "first computer system"; EDGE2 160 as "second network device" or "second computer system"; router 171/172 as "underlay network device"; TEP 151/161 as "tunnel endpoint"; and TIF 181/182 as "tunnel interface." It should be understood that examples of the present disclosure are applicable to other similar network entities or elements.

At 310 in FIG. 3, tunnel 180 may be established between a first tunnel interface=TIF1 181 configured on EDGE1 150 and a second tunnel interface=TIF2 182 configured on EDGE2 160. In the example in FIG. 1, traffic over tunnel 180 may be encapsulated with an outer header (see 193) that is addressed from a first tunnel endpoint=TEP1 assigned with IP-TEP1=1.1.1.1/32 to a second tunnel endpoint=TEP2 assigned with IP-TEP2=2.2.2.2/32. Any suitable tunnelling protocol may be used, such as GRE shown in FIG. 1, VPN, IPSec, etc.

At 320 in FIG. 3, a first session for routing information exchange may be established between TEP1 151 of EDGE1 150 and an underlay network device=R1 171 that connects EDGE1 150 with EDGE2 160 in physical network 103. At 330 in FIG. 3, a second session for routing information exchange may be established between tunnel interfaces TIF1 181 and the TIF2 182 over tunnel 180. Any suitable dynamic routing protocol may be used for routing information exchange, such as BGP, etc.

In the example in FIG. 1, the first session may be established over 1.1.1.0/24 between EDGE1 150 and R1 171, and the second session over 20.20.20.0/24 over tunnel 180. For the first session, EDGE1 150 with IP-TEP1=1.1.1.1/32 and R1 171 with IP-R1=1.1.1.2 may be configured as BGP neighbors or peers. For the second session, EDGE1 150 with IP-TIF1=20.20.20.1 and EDGE2 160 with IP-TIF2=20.20.20.2 may be configured as BGP neighbors or peers. Using BGP as an example, the "routing information" may be in the form of BGP route advertisements.

At 340 and 350 in FIG. 3, in response to receiving first routing information from R1 171 over the first session (e.g., 1.1.1.0/24), underlay router=R1 171 may be configured to be a next hop to reach the IP-TEP2=2.2.2.2/32 in physical network 103. Here, the term "configure" may refer generally to any suitable operation(s) to calculate or program the next hop, which involve control-plane decisions to arrive at the desired routing table at EDGE 150/160. At 360 and 370 in FIG. 3, in response to receiving the first routing information from R1 171 over the first session, or second routing information from TIF2 182 over the second session (e.g., 20.20.20.0/24), R1 171 may be retained as the next hop to reach the IP-TEP2=2.2.2.2/32, thereby refraining from updating the next hop from R1 171 to TIF2 182 during the second session over tunnel 180.

In the following, a first example that involves configuring and retaining the next hop in response to receiving the first routing information (see 340, 350 and 370) will be explained using FIGS. 4 and 5. In particular, in response to receiving the first routing information, block 350 may involve updating a routing table to include a first entry matching with IP-TEP2=2.2.2.2/32 assigned to TEP2 161. Further, block 370 may involve updating the routing table to include a second entry to override (any) second routing information that advertises, over the second session, TIF2 182 as the next hop to reach TEP2 161.

A second example that involves configuring the next hop in response to the first routing information, and retaining the next hop in response to the second routing information (see 340, 350, 360 and 370) will be explained using FIGS. 6 and 7. In particular, in response to receiving the second routing information, block 370 may involve retaining underlay router=R1 171 as a next hop to reach TEP2 161 based on an excluded address specified in the second routing information. The excluded address may be associated with TEP2 161 assigned with IP-TEP2=2.2.2.2/32.

A third example that involves optional inbound and/or outbound route filtering will be explained using FIG. 8. Depending on the desired implementation, route filtering may be implemented along with the examples in FIGS. 4, 5, 6 and 7.

Tunnel and Session Establishment

Some examples will be explained using FIG. 4, which is a schematic diagram illustrating a first example of tunnel-based routing calculation in SDN environment 100. Throughout the present disclosure, GRE will be used as an example tunneling protocol for establishing tunnel 180, and BGP as an example dynamic routing protocol for routing information exchange. It should be noted that the following examples may be implemented using other tunneling and/or dynamic routing protocols.

Block 310 in FIG. 3 may involve establishing GRE tunnel 180 between a pair of tunnel endpoints=TEP1 151 and TEP2 161. In practice, tunnel endpoint 151/161 may be a loopback interface, which is usually configured to identify a machine uniquely through an IP address. In general, a loopback interface is an entire subnet with one machine in it. Using IPv4 addressing, a loopback interface has mask=255.255.255.255. Note that it is not necessary for TEP1 151 and TEP2 161 to be in the same subnet. For example, 1.1.1.1/32 assigned to TEP1 151 and 2.2.2.2/32 assigned to TEP2 161 may be configured to be loopback interfaces.

Blocks 320-330 in FIG. 3 may involve EDGE1 150 establishing a first BGP session with router R1 171 to exchange routing information, and a second BGP session with EDGE2 160 over tunnel 180. In the example in FIG. 4, EDGE1 150 may maintain a data structure (e.g., routing table 410) to store any routing information learned over the BGP sessions. If a BGP neighbor belongs to the same subnet as a "directly-connected" interface, information associated with the interface will be added to routing table 410.

For the first BGP session with R1 171, since IP-TEP1=1.1.1.1/32 is in the same subnet as its BGP neighbor IP-R1=1.1.1.2, routing table 410 may include entry= [1.1.1.0/24 is directly connected, UPLINK1] to represent an uplink connection with R1 171; see 411. For the second BGP session over tunnel 180, IP-TIF1=20.20.20.1 is in the same subnet as BGP neighbor with IP-TIF2=20.20.20.2. In this case, routing table 410 may include entry=[20.20.20.0/24 is directly connected, GRE1] to represent tunnel 180; see 412. Using a tunneling protocol such as GRE, tunnel interfaces 181-182 appear to be "directly-connected" via tunnel 180 established.

Similarly, EDGE2 160 may establish a first BGP session with router R2 172, and a second BGP session with EDGE1 150 over tunnel 180. For the first BGP session, since IP-TEP2=2.2.2.2/32 is in the same subnet as its BGP neighbor IP-R2=2.2.2.1, routing table 420 may include entry= [1.1.1.0/24 is directly connected, UPLINK1] to represent an uplink connection with R2 172; see 421. For the second BGP session, local IP-TIF2=20.20.20.2 is in the same subnet as BGP neighbor with remote IP-TIF1=20.20.20.1. In this case, routing table 420 may include entry=[20.20.20.0/24 is directly connected, GRE1] to represent tunnel 180; see 422.

Figure 4:
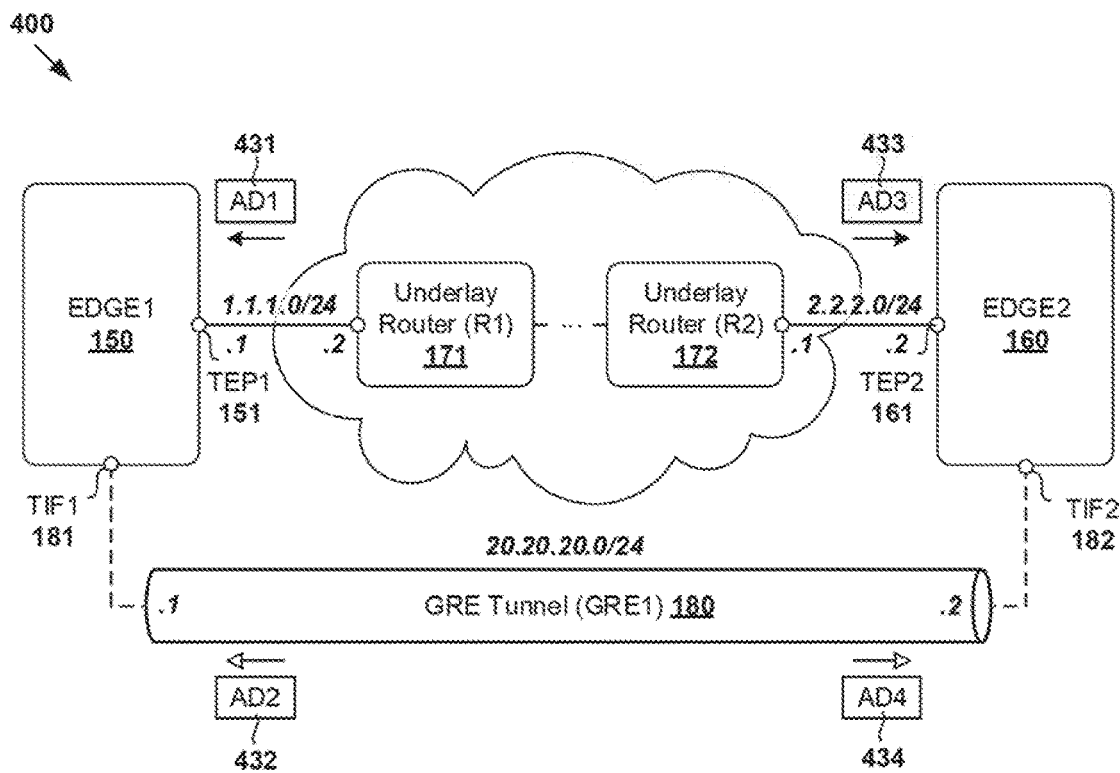
FIG. 4 is a flowchart of a first detailed example process of tunnel-based routing calculation in an SDN environment.
Figure 5:
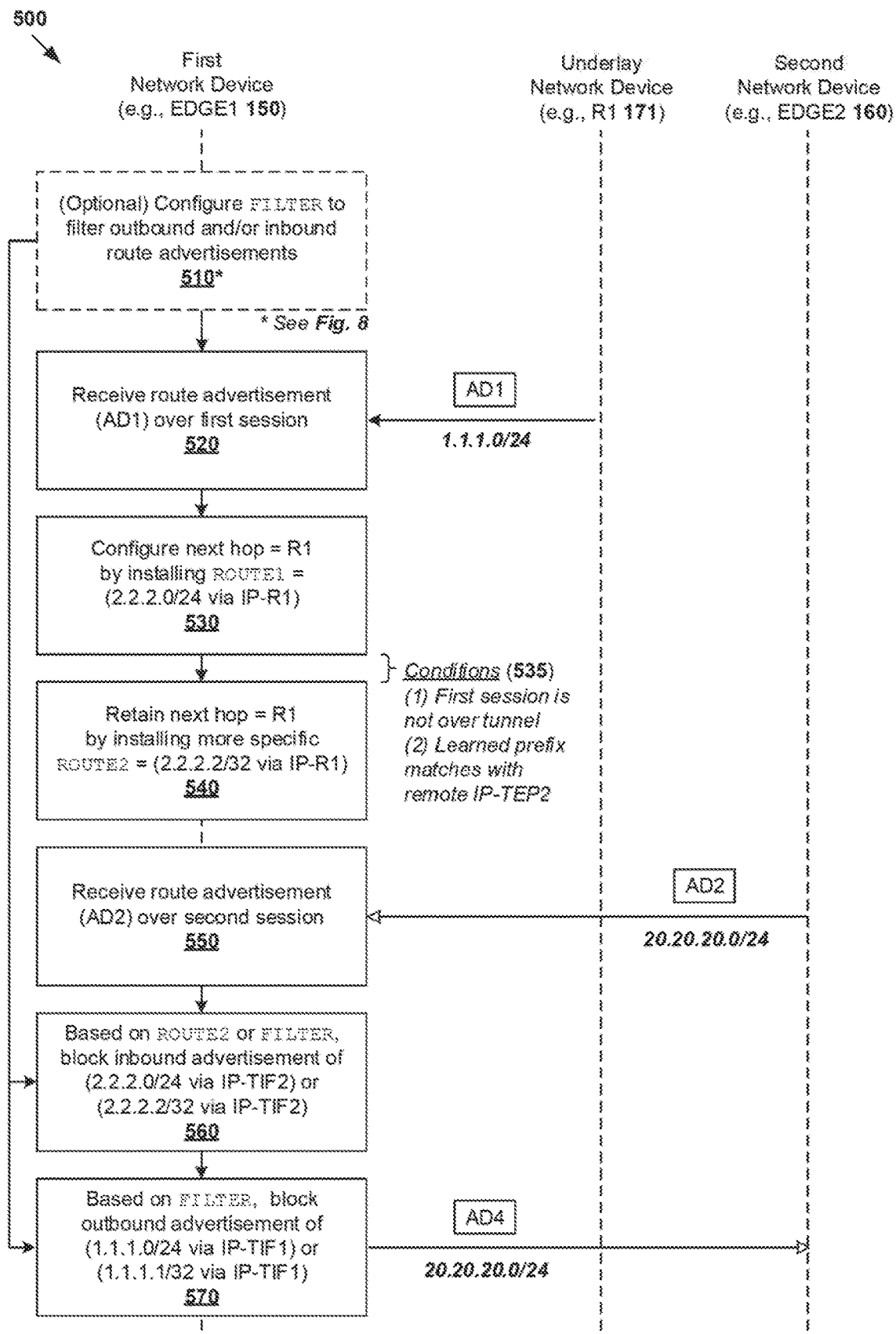
FIG. 5 is a schematic diagram illustrating a first example of tunnel-based routing calculation in an SDN environment.

First Example (See FIGS. 4 and 5)

The example in FIG. 4 will be explained using FIG. 5, which is a flowchart of first example detailed process 500 for tunnel-based routing calculation in SDN environment 100. Example process 500 may include one or more operations, functions, or actions illustrated by one or more blocks, such as 520 to 570. The various blocks may be combined into fewer blocks, divided into additional blocks, and/or eliminated depending on the desired implementation. Note that (optional) filter configuration according to block 510, 560 and 570 will be described using FIG. 8.

(a) Routing Calculation at EDGE1

At 520 and 530 in FIG. 5, in response to receiving first routing information (see "AD1" 431) over the first BGP session with R1 171, EDGE1 150 may configure next hop=R1 171 for remote tunnel endpoint TEP2 161 with IP-TEP2=2.2.2.2/32. In the example in FIG. 4, the configuration at block 530 may involve updating routing table 410 to include ROUTE1=[2.2.2.0/24 via IP-R1=1.1.1.2, UPLINK1]. This way, underlay router R1 171 may be configured to be the next hop for any destination IP address matching IP prefix=2.2.2.0/24. See 413 in FIG. 4.

At 535 in FIG. 5, in response to receiving "AD1" 431 over the first BGP session, EDGE1 150 may check whether several conditions are satisfied. A first condition is that the first session is not established over tunnel 180, which means that "AD1" 431 is not received over tunnel 180. This may involve identify the BGP neighbor by checking a source IP address in a route advertisement and determining whether the BGP neighbor is reachable over a tunnel interface or otherwise. A second condition is whether the IP prefix=2.2.2.0/24 in the newly learned ROUTE1 (see 413) matches with IP-TEP2=2.2.2.2/32, which is the IP address of remote TEP2 161. In practice, information relating to BGP neighbors may be disseminated by a management entity (not shown) in SDN environment 100. EDGE1 150 may also check whether to accept the advertisement according to some pre-configured BGP policies.

At 540 in FIG. 5, if the conditions are satisfied, routing table 410 may be further updated to install ROUTE2= [2.2.2.2/32 via IP-R1=1.1.1.2, UPLINK1]. This has the effect of retaining R1 171 as the next hop for traffic destined for IP-TEP2=2.2.2.2/32. See 414 in FIG. 4. Note that prefix=2.2.2.2/32 in ROUTE2 (see 414) is a more specific match for IP-TEP2=2.2.2.2/32 compared to prefix=2.2.2.0/ 24 in ROUTE1 (see 413). As such, when forwarding traffic addressed to TEP2 161, ROUTE2 will be preferred over ROUTE1 according to a longest prefix matching rule.

In practice, since each entry in routing table 410 may specify a subnet, a destination address may match more than one entry. The more specific of the matching entry (i.e., the one with the longest subnet mask) is referred to as the longest prefix match. Using IPv4 addressing and classless inter-domain routing (CIDR) notation, for example, "2.2.2.0/24" is associated with subnet mask 255.255.255.0, while "2.2.2.2/32" is associated with a longer subnet mask 255.255.255.255. For IPv6 addressing, a "/128" notation may be used.

By installing ROUTE2, R1 171 may be retained as the next hop during the second BGP session over tunnel 180, thereby reducing or eliminating the likelihood of tunnel flapping. At 550 and 560 in FIG. 5, in response to receiving second routing information (see "AD2" 432 in FIG. 4) over tunnel 180, EDGE1 150 may block or disregard any inbound routing information that advertises that TEP2 161 is reachable via tunnel 180. Based on the more specific ROUTE2= [2.2.2.2/32 via IP-R1=1.1.1.2, UPLINK1], any attempt to install an alternative route to 2.2.2.0/24 via IP-TIF2=20.20.20.2 will be disregarded or ignored. In other words, ROUTE2 may be used to override any second routing information ("AD2" 432) that advertises, over the second session, TIF2 182 as the next hop to reach TEP2 161.

In the example in FIG. 4, EDGE1 150 may also learn routing information to reach destinations located at second site 102 through the second BGP session. For example, since VM2 132 assigned with IP-VM2=192.168.1.2, EDGE2 160 may send route advertisement over tunnel 180 to cause EDGE1 150 to learn [192.168.1.0/24 via 20.20.20.2, GRE1]. This way, EDGE1 150 may learn that VM2 132 is reachable over tunnel 180 (labelled "GRE1") via next hop=TEP2 161 assigned with IP-TEP2=20.20.20.2. The entry is applicable when VM1 131 at first site 101 attempts to communicate with VM2 132 at second site 102. See 415 in FIG. 4.

(b) Routing Calculation at EDGE2

The example in FIG. 5 may be repeated at EDGE2 160 to maintain R2 172 as the next hop for traffic to reach remote tunnel endpoint=TEP1 151. According to 520 and 530, in response to receiving "AD3" 433 over the first BGP session with R2 172, routing table 420 may be updated to include ROUTE3=[1.1.1.0/24 via IP-R2=2.2.2.1, UPLINK1]. This way, R2 172 may be configured to be the next hop for any destination IP address matching IP prefix=1.1.1.0/24. See 423 in FIG. 4.

Further, at 525 in FIG. 5, in response to receiving "AD3" 433, EDGE2 160 may check whether "AD3" 433 is received over tunnel 180. If not, EDGE2 160 may further check whether the IP prefix=1.1.1.0/24 in the newly learned ROUTE3 (see 423 in FIG. 4) matches with IP-TEP1=1.1.1.1/32, which is the IP address of remote tunnel endpoint=TEP1 151. At 540 in FIG. 5, if there is a match, routing table 420 may be further updated to install ROUTE4=[1.1.1.1/32 via IP-R2=2.2.2.1, UPLINK1]; see 424 in FIG. 4. Again, this is to retain underlay R2 172 as the next hop for traffic destined for IP-TEP1=1.1.1.1/32.

At 550 and 560 in FIG. 5, in response to receiving "AD4" 434 in FIG. 4 over tunnel 180, EDGE2 160 may block or disregard any inbound route advertisement that advertises that TEP1 151 is reachable via tunnel 180. Based on the more specific ROUTE4=[1.1.1.1/32 via IP-R2=2.2.2.1, UPLINK1], any attempt to install an alternative route to 1.1.1.0/24 via IP-TIF1=20.20.20.1 will be disregarded or ignored. In other words, ROUTE4 may be installed to override any routing information ("AD4" 434) that advertises, over the second session, TIF1 181 as the next hop to reach TEP1 151.

Based on "AD4" 434, EDGE2 160 may also learn routing information to reach destinations located at first site 101. For example, EDGE1 150 may advertise that subnet=176.16.1.0/24 in which VM1 131 is located is reachable via tunnel 180. This causes EDGE2 160 to learn [176.16.1.0/24 via IP-TIF1=20.20.20.1, GRE1]; see 425 in FIG. 4. The entry is applicable when VM2 132 located at second site 102 wishes to communicate with VM1 131.

In practice, routing table 410/420 may include additional information, such as autonomous system (AS) path information, local preference (e.g., internal cost of a destination), multi-exit discriminator (e.g., preference of one peering point over another), etc. These attributes are not shown in the examples for simplicity.

Figure 6:
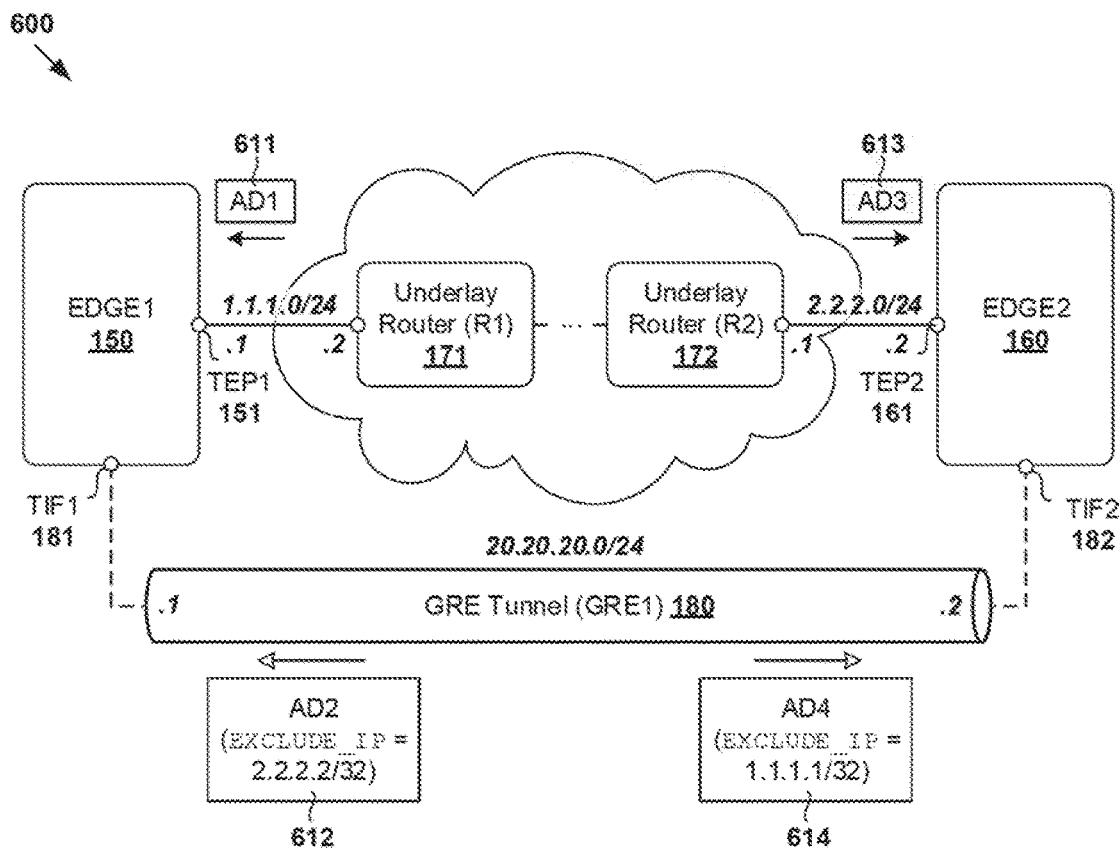
FIG. 6 is a flowchart of a second example detailed process of tunnel-based routing calculation with address exclusion in an SDN environment.
Figure 7:
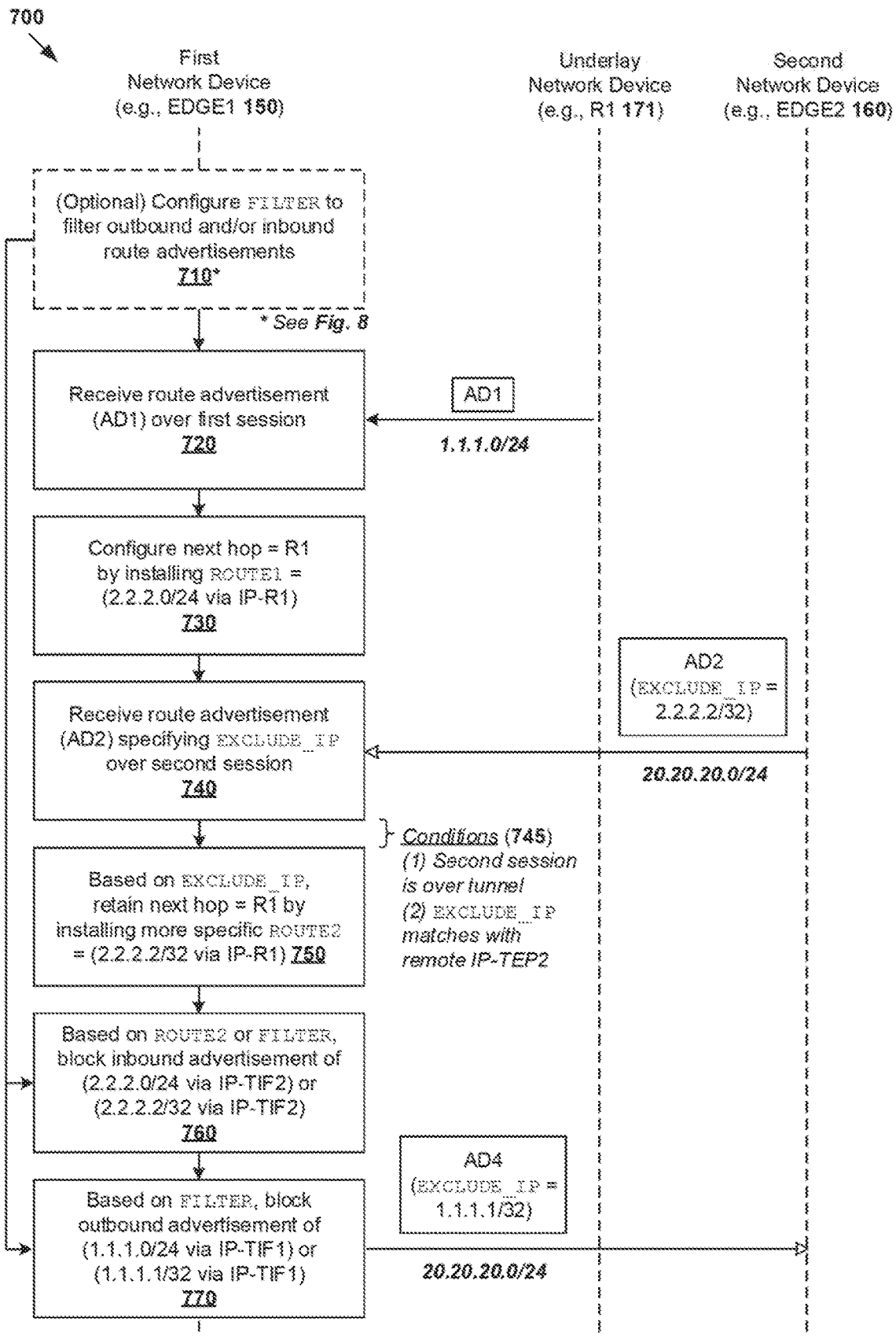
FIG. 7 is a schematic diagram illustrating a second example of tunnel-based routing calculation with address exclusion in an SDN environment.

Second Example (See FIGS. 6 and 7)

FIG. 6 is a schematic diagram illustrating second example 600 of tunnel-based routing calculation with address exclusion in SDN environment 100. The example in FIG. 6 will be explained using FIG. 7, which is a flowchart of first example detailed process 700 for tunnel-based routing calculation with address exclusion in SDN environment 100. Example process 700 may include one or more operations, functions, or actions illustrated by one or more blocks, such as 720 to 770. The various blocks may be combined into fewer blocks, divided into additional blocks, and/or eliminated depending on the desired implementation. Note that filter configuration according to blocks 710 and 770 will be described using FIG. 8.

(a) Routing Calculation at EDGE1

Blocks 720-730 in FIG. 7 may be implemented in a similar manner to 520-530 in FIG. 5. In the example in FIG. 6, in response to receiving "AD1" 611 over the first BGP session with R1 171, EDGE1 150 may install ROUTE1=[2.2.2.0/24 via IP-R1=1.1.1.2, UPLINK1]. See 620 in FIG. 6. In contrast to the example in FIG. 5, however, the more specific ROUTE2=[2.2.2.2/32 via IP-R1=1.1.1.2, UPLINK1] may be installed in response to receiving "AD2" 612 over tunnel 180.

One approach is address exclusion by configuring "AD2" 612 to specify an excluded IP prefix or address (denoted EXCLUDE_IP), which should not be learned by EDGE1 150 over the second BGP session over tunnel 180. In practice, BGP neighbors exchange routing information using UPDATE messages to, for example, advertise feasible routes. An UPDATE message may include a BGP header and a number of optional fields, such as withdrawn routes length, withdrawn routes, total path attribute length, path attributes, network layer reachability information (NLRI), etc.

According to examples of the present disclosure, BGP may be configured to allow the definition of an "exclude address information" field in UPDATE messages. This provides a mechanism for conditional next-hop calculation, which allows a first tunnel interface to inform a second tunnel interface to configure the first tunnel interface as a next hop except, for the IP address(es) specified in the "exclude address information" field. Similar to the NLRI field in a BGP advertisement, the exclude address Information field may be encoded using a list of 2-tuples, such as <length, prefix>. The length field indicates the length in bits of the IP address prefix. The prefix field may specify an IP address prefix. This way, a BGP UPDATE message may set the exclude address information field to a particular IP prefix that should be excluded.

At 745 in FIG. 7, in response to receiving "AD2" 612 specifying EXCLUDE_IP=2.2.2.2/32, EDGE1 150 may check whether several conditions are satisfied. A first condition is that "AD2" 612 is received over tunnel 180 during the second BGP session. This may involve checking a source IP address in "AD2" 612 to identify that BGP neighbor=TIF2 182 is a tunnel interface. A second condition is that EXCLUDE_IP in "AD2" 612 matches with IP-TEP2=2.2.2.2/32, which is the IP address of remote TEP2 161. The involves checking that EXCLUDE_IP falls within the IP prefix=2.2.2.0/24 matching IP-TEP2=2.2.2.2/32 in an existing routing entry (see 620 in FIG. 6).

At 750 in FIG. 7, if the conditions are satisfied, routing table 410 may be further updated to install ROUTE2=[2.2.2.2/32 via IP-R1=1.1.1.2, UPLINK1]. This has the effect of retaining R1 171 as the next hop for traffic destined for IP-TEP2=2.2.2.2/32. See 630 in FIG. 6. Note that prefix=2.2.2.2/32 in ROUTE2 (see 630) is more specific than prefix=2.2.2.0/24 in ROUTE1 (see 610), and therefore will be more preferred according to a longest prefix matching rule.

At 760 in FIG. 7, based on ROUTE2=[2.2.2.2/32 via IP-R1=1.1.1.2, UPLINK1], any attempt to install alternative route to 2.2.2.0/24 via IP-TIF2=20.20.20.2 will be disregarded or ignored. This way, EDGE1 150 may retain R1 171 to be the next hop for remote TEP2 161 with IP-TEP2=2.2.2.2/32. Also, remote TIF2 182 to be the next hop for destination networks (e.g., 198.168.1.0/24) in second site 102. See 640 in FIG. 6.

(b) Routing Calculation at EDGE2

The example in FIG. 7 may be repeated at EDGE2 160 to maintain R2 172 as the next hop for traffic to reach remote tunnel endpoint=TEP1 151. In response to receiving "AD3" 613 over the first BGP session with R2 172, routing table 420 may be updated to include ROUTE3=[1.1.1.0/24 via IP-R2=2.2.2.1, UPLINK1]. This way, R2 172 may be configured to be the next hop for any destination IP address matching IP prefix=1.1.1.0/24. See 650 in FIG. 6.

In response to receiving "AD4" 614 (e.g., UPDATE message) specifying EXCLUDE_IP=1.1.1.1/32 over tunnel 180, EDGE2 160 may update routing table 420 to install ROUTE4=[1.1.1.1/32 via IP-R2=2.2.2.1, UPLINK1]. See 660 in FIG. 6. The involves checking that EXCLUDE_IP falls within the IP prefix=1.1.1.0/24 matching IP-TEP1=1.1.1.1/32 in ROUTE3 (see 650 in FIG. 6). The installation of ROUTE4 has the effect of retaining underlay R2 172 as the next hop for traffic destined for IP-TEP1=1.1.1.1/32. Based on "AD4" 614, remote TIF1 181 may be configured to be the next hop for destination networks (e.g., 172.16.1.0/24) in first site 102. See 670 in FIG. 6.

Multipath Routing

For simplicity, EDGE1 150 is shown to be connected to one next hop=R1 171, and EDGE2 160 connected to next hop=R2 172. In practice, there may be multiple next hops for 2.2.2.0/24. In this case, the more specific routing entry for 2.2.2.2/32 may be configured for each next hop from EDGE1 150. Using M=number of next hops, [2.2.2.2/32 via nextHop_j, UPLINK_j] may be configured for each j=1, . . . , M in the examples in FIGS. 4 to 7.

From the perspective of EDGE2 160, if there are multiple next hops for 1.1.1.0/24, the more specific routing entry for 1.1.1.1/32 may be configured for each next hop. Using K=number of next hops, [1.1.1.1/32 via nextHop_k, UPLINK_k] may be configured for each k=1, . . . , K in the examples in FIGS. 4 to 7. Any suitable routing strategy may be used by EDGE1 150 and EDGE2 160 to select one of the multiple next hops, such as equal-cost multipath routing (ECMP), etc.

Figure 8:
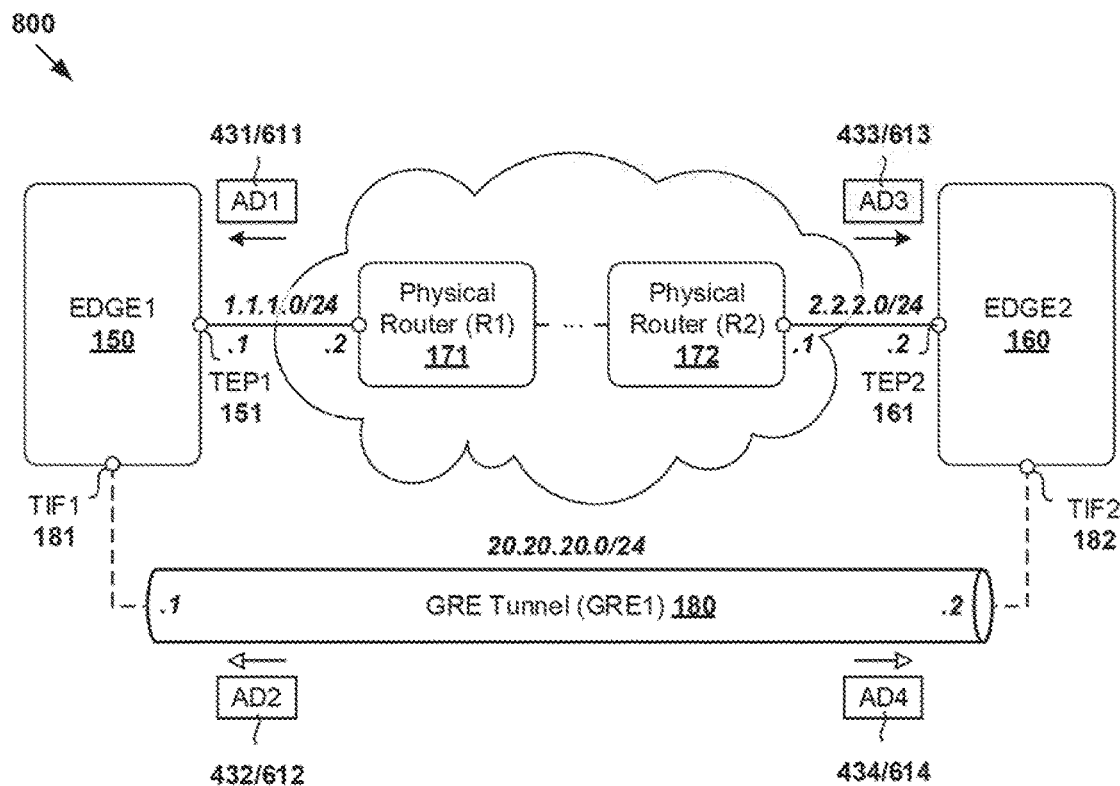
FIG. 8 is a schematic diagram illustrating a third example of tunnel-based routing calculation in an SDN environment.

Third Example (See FIG. 8)

According to examples of the present disclosure, inbound and/or outbound route filtering may be performed to retain a particular next hop in SDN environment 100 according to block 370 in FIG. 3. For example, inbound route filtering may be configured to block ingress or incoming route advertisements, and outbound route filtering to block egress or outgoing route advertisements. Depending on the desired implementation, any suitable approach may be used to configure BGP filters, such as filter list, AS-path access list, IP prefix list, route maps, distribute list, etc.

According to blocks 510 in FIGS. 5 and 710 in FIG. 7, BGP filter(s) may be configured to prevent the learning of a remote tunnel endpoint network in the IN direction and prevent the advertising of a local tunnel endpoint network in the OUT direction. This way, at blocks 560-570 in FIGS. 5 and 760-770 in FIG. 7, corresponding inbound and/or outbound route advertisements may be blocked during the second BGP session between tunnel interfaces 181-182 over tunnel 180 (i.e., between IP-TIF1=20.20.20.1 and IP-TIF2=20.20.20.2).

Some examples are shown in FIG. 8, which is a schematic diagram illustrating third example 800 of tunnel-based routing calculation in SDN environment 100. At 811 in FIG. 8, EDGE1 150 may configure a first filter to block or deny any outbound route advertisement (i.e., "DENY OUT") associated with local tunnel endpoint=TEP1 151 associated with network=1.1.1.0/24 or loopback interface IP-TEP1=1.1.1.1/32. At 812, a second filter may be configured to block any inbound route advertisement (i.e., "DENY IN") associated with remote tunnel endpoint=TEP2 161 associated with network=2.2.2.0/24 or loopback interface IP-TEP2=2.2.2.2/32.

At 821 in FIG. 8, EDGE2 160 may configure a third filter to block any outbound route advertisement (i.e., "DENY OUT") associated with local tunnel endpoint=TEP2 161 associated with network=2.2.2.0/24 or loopback interface IP-TEP2=2.2.2.2/32. At 822, a second filter may be configured to block any inbound route advertisement (i.e., "DENY IN") associated with remote tunnel endpoint=TEP1 151 associated with network=1.1.1.0/24 or loopback interface IP-TEP1=1.1.1.1/32.

Depending on the desired implementation, route filtering according to the third example in FIG. 8 may be used together with the first example in FIGS. 4-5 and/or second example in FIGS. 6-7. It should be noted that filters 811-812 and 821-822 are only applicable to the second BGP session over tunnel 180. By automatically creating these smart BGP filters, the likelihood of tunnel flapping for the tunnel-based BGP sessions may be reduced. If there are many GRE tunnels with multiple cloud environments, the automation of filter configuration becomes more valuable.

Container Implementation

Although discussed using various VMs, it should be understood that examples of the present disclosure may be performed in cloud environments that include other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the above examples, tunnel-based routing calculation may be performed to facilitate communication among containers located at different geographical sites in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as a "first network device" or "second network device" may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first network device to perform tunnel-based routing calculation in a software-defined networking (SDN) environment that includes the first network device and a second network device, wherein the method comprises:

establishing a tunnel between a first tunnel interface configured on the first network device and a second tunnel interface configured on the second network device, wherein a packet for forwarding over the tunnel is encapsulated with an outer header that is addressed from a first tunnel endpoint configured on the first network device to a second tunnel endpoint configured on the second network device;

establishing a first session for routing information exchange between the first tunnel endpoint and an underlay network device that connects the first network device with the second network device;

establishing a second session for routing information exchange between the first tunnel interface and the second tunnel interface over the tunnel;

in response to receiving first routing information from the underlay network device over the first session,
configuring the underlay network device to be a next hop to reach the second tunnel endpoint by updating a routing table to include a first entry matching with a second tunnel endpoint address assigned to the second tunnel endpoint; and
retaining the underlay network device as the next hop by updating the routing table to include a second entry to override second routing information that advertises, over the second session, the second tunnel interface as the next hop to reach the second tunnel endpoint.

2. The method of claim 1, wherein configuring the underlay network device to be the next hop comprises:

based on the first routing information, updating the routing table to include the first entry specifying that a first prefix matching the second tunnel endpoint address is reachable via the underlay network device.

3. The method of claim 1, wherein retaining the underlay network device as the next hop comprises:

based on the first routing information, updating the routing table to include the second entry specifying that a second prefix matching the second tunnel endpoint address is reachable via the underlay network device, wherein the second entry is preferred over the first entry according to a longer matching prefix rule.

4. The method of claim 3, wherein retaining the underlay network device as the next hop comprises:

based on the first routing information, updating the routing table to include the second entry specifying the second prefix in the form of a loopback interface address associated with the second tunnel endpoint.

5. The method of claim 3, wherein retaining the underlay network device as the next hop comprises:

prior to updating the routing table to include the second entry, determining that (a) the first routing information is not received over the second session and (b) the second tunnel endpoint address falls within the first prefix in the first entry.

6. The method of claim 1, wherein the method further comprises:

configuring, for the second session over the tunnel, an outbound route advertisement filter to filter an outbound advertisement specifying that the first tunnel endpoint is reachable via the first tunnel interface.

7. The method of claim 1, wherein the method further comprises:

configuring, for the second session over the tunnel, an inbound route advertisement filter to filter an inbound route advertisement specifying that the second tunnel endpoint is reachable via the second tunnel interface.

8. A non-transitory computer-readable storage medium that includes a set of instructions which, in response to execution by a processor of a first network device, cause the processor to perform a method of tunnel-based routing calculation, wherein the method comprises:
  establishing a tunnel between a first tunnel interface configured on the first network device and a second tunnel interface configured on a second network device, wherein a packet for forwarding over the tunnel is encapsulated with an outer header that is addressed from a first tunnel endpoint configured on the first network device to a second tunnel endpoint configured on the second network device;
  establishing a first session for routing information exchange between the first tunnel endpoint and an underlay network device that connects the first network device with the second network device;
  establishing a second session for routing information exchange between the first tunnel interface and the second tunnel interface over the tunnel;
  in response to receiving first routing information from the underlay network device over the first session,
    configuring the underlay network device to be a next hop to reach the second tunnel endpoint by updating a routing table to include a first entry matching with a second tunnel endpoint address assigned to the second tunnel endpoint; and
    retaining the underlay network device as the next hop by updating the routing table to include a second entry to override second routing information that advertises, over the second session, the second tunnel interface as the next hop to reach the second tunnel endpoint.

9. The non-transitory computer-readable storage medium of claim 8, wherein configuring the underlay network device to be the next hop comprises:
  based on the first routing information, updating the routing table to include the first entry specifying that a first prefix matching the second tunnel endpoint address is reachable via the underlay network device.

10. The non-transitory computer-readable storage medium of claim 8, wherein retaining the underlay network device as the next hop comprises:
  based on the first routing information, updating the routing table to include the second entry specifying that a second prefix matching the second tunnel endpoint address is reachable via the underlay network device, wherein the second entry is preferred over the first entry according to a longer matching prefix rule.

11. The non-transitory computer-readable storage medium of claim 10, wherein retaining the underlay network device as the next hop comprises:
  based on the first routing information, updating the routing table to include the second entry specifying the second prefix in the form of a loopback interface address associated with the second tunnel endpoint.

12. The non-transitory computer-readable storage medium of claim 10, wherein retaining the underlay network device as the next hop comprises:
  prior to updating the routing table to include the second entry, determining that (a) the first routing information is not received over the second session and (b) the second tunnel endpoint address falls within the first prefix in the first entry.

13. The non-transitory computer-readable storage medium of claim 8, wherein the method further comprises:
  configuring, for the second session over the tunnel, an outbound route advertisement filter to filter an outbound advertisement specifying that the first tunnel endpoint is reachable via the first tunnel interface.

14. The non-transitory computer-readable storage medium of claim 8, wherein the method further comprises:
  configuring, for the second session over the tunnel, an inbound route advertisement filter to filter an inbound route advertisement specifying that the second tunnel endpoint is reachable via the second tunnel interface.

15. A computer system, being a first network device, comprising:
  a processor; and
  a non-transitory computer-readable medium having stored thereon instructions that, when executed by the processor, cause the processor to:
  establish a tunnel between a first tunnel interface configured on the first network device and a second tunnel interface configured on the second network device, wherein a packet for forwarding over the tunnel is encapsulated with an outer header that is addressed from a first tunnel endpoint configured on the first network device to a second tunnel endpoint configured on the second network device;
  establish a first session for routing information exchange between the first tunnel endpoint and an underlay network device that connects the first network device with the second network device;
  establish a second session for routing information exchange between the first tunnel interface and the second tunnel interface over the tunnel;
  in response to receiving first routing information from the underlay network device over the first session,
    configure the underlay network device to be a next hop to reach the second tunnel endpoint by updating a routing table to include a first entry matching with a second tunnel endpoint address assigned to the second tunnel endpoint; and
    retain the underlay network device as the next hop by updating the routing table to include a second entry to override second routing information that advertises, over the second session, the second tunnel interface as the next hop to reach the second tunnel endpoint.

16. The computer system of claim 15, wherein the instructions for configuring the underlay network device to be the next hop cause the processor to:
  based on the first routing information, update the routing table to include the first entry specifying that a first prefix matching the second tunnel endpoint address is reachable via the underlay network device.

17. The computer system of claim 15, wherein the instructions for retaining the underlay network device as the next hop cause the processor to:
  based on the first routing information, update the routing table to include the second entry specifying that a second prefix matching the second tunnel endpoint address is reachable via the underlay network device, wherein the second entry is preferred over the first entry according to a longer matching prefix rule.

18. The computer system of claim 17, wherein the instructions for retaining the underlay network device as the next hop cause the processor to:
  based on the first routing information, update the routing table to include the second entry specifying the second prefix in the form of a loopback interface address associated with the second tunnel endpoint.

19. The computer system of claim 17, wherein the instructions for retaining the underlay network device as the next hop cause the processor to:

prior to updating the routing table to include the second entry, determine that (a) the first routing information is not received over the second session and (b) the second tunnel endpoint address falls within the first prefix in the first entry.

20. The computer system of claim 15, wherein the instructions further cause the processor to:

configure, for the second session over the tunnel, an outbound route advertisement filter to filter an outbound advertisement specifying that the first tunnel endpoint is reachable via the first tunnel interface.

21. The computer system of claim 15, wherein the instructions further cause the processor to:

configure, for the second session over the tunnel, an inbound route advertisement filter to filter an inbound route advertisement specifying that the second tunnel endpoint is reachable via the second tunnel interface.

\* \* \* \* \*